United States Patent [19]
Patton, III

[11] Patent Number: 5,889,629
[45] Date of Patent: Mar. 30, 1999

[54] METHOD AND APPARATUS FOR CONTROLLING DISK DRIVE HEAD PARKING DURING POWER INTERRUPTION

[75] Inventor: Charles Royston Patton, III, Murrieta, Calif.

[73] Assignee: Western Digital Corporation, Irvine, Calif.

[21] Appl. No.: 673,769

[22] Filed: Jun. 27, 1996

[51] Int. Cl.⁶ ........................................ G11B 5/55
[52] U.S. Cl. ........................................ 360/75; 360/69
[58] Field of Search ...................... 360/75, 86, 78.04; 395/790

[56] References Cited

U.S. PATENT DOCUMENTS

| | | | |
|---|---|---|---|
| 4,658,308 | 4/1987 | Sander, Jr. ............................. | 360/75 X |
| 4,679,102 | 7/1987 | Wevers et al. ......................... | 360/75 |
| 4,786,995 | 11/1988 | Stupeck et al. ....................... | 360/75 |
| 4,807,062 | 2/1989 | Onodera ................................. | 360/75 |
| 4,831,469 | 5/1989 | Hanson et al. ......................... | 360/75 |
| 4,866,554 | 9/1989 | Stupeck et al. ....................... | 360/105 |
| 4,885,517 | 12/1989 | Pennock ................................ | 318/678 |
| 5,325,030 | 6/1994 | Yamamura et al. .................... | 318/563 |
| 5,384,524 | 1/1995 | Romano ................................. | 318/569 |
| 5,455,496 | 10/1995 | Williams et al. ...................... | 360/75 X |
| 5,469,314 | 11/1995 | Morehouse et al. ................... | 360/105 |
| 5,473,238 | 12/1995 | Latham, II et al. .................... | 318/560 |
| 5,486,957 | 1/1996 | Albrecht ................................ | 360/75 |
| 5,495,376 | 2/1996 | Wasson et al. ........................ | 360/75 X |
| 5,594,600 | 1/1997 | Bruner et al. .......................... | 360/69 |
| 5,600,217 | 2/1997 | Bartlett ................................... | 360/75 X |

*Primary Examiner*—Aristotelis M. Psitos
*Assistant Examiner*—K. Wong
*Attorney, Agent, or Firm*—Leo J. Young, Esq.; Milad G. Shara, Esq.

[57] ABSTRACT

A system for powering a disk drive microprocessor using the back electromotive force (BEMF) generated by the still-spinning spindle motor after host DC power fails, and for parking the heads under microprocessor control in a manner similar to that of a conventional seek. The system detects failing host computer DC power, converts the BEMF to DC, applies the DC power to the microprocessor, and moves the heads toward the parking zone under microprocessor control in accordance with a seek profile or other suitable control method of a type conventionally used for seeking. Thus, the heads travel to the parking zone at controlled velocities that minimize the travel or seek time.

3 Claims, 3 Drawing Sheets

METHOD AND APPARATUS FOR CONTROLLING DISK DRIVE HEAD PARKING DURING POWER INTERRUPTION

BACKGROUND OF THE INVENTION

1. Field of the Invention

This invention relates generally to disk drive parking control systems and, more specifically, to the means by which such systems park the disk drive heads using power derived from the kinetic energy of the spinning disk when external power is removed from the disk drive.

2. Description of the Related Art

A computer typically includes one or more hard disk drives that provide economical, nonvolatile storage for relatively large quantities of data. A typical hard disk drive includes one or more platters or disks having magnetic recording surfaces, disk drive controller electronics, one or more actuator arms on which are mounted magnetic transducer heads, an actuator motor for moving the actuator arms, and a spin motor for rotating the disks. The disk drive may also include amplifier and driver circuitry for the heads and motors, respectively. A well-known type of actuator motor is known as a voice coil motor (VCM). In response to signals received from the controller, the VCM swings an actuator arm and its transducer heads across the surface of the disk. The procedure of moving the heads to a predetermined position on the disk (at which it is usually desired to read or write data) is known as a seek.

A seek may use a one-pass control procedure that merely sends the heads to a predetermined disk location without processing feedback signals or it may use an iterative control procedure that iteratively adjusts the seek motion responsive to feedback of true head position information. In the iterative process, the controller receives servo signals from the heads and uses those signals to determine the radial position of the heads on the disk. In response to this servo feedback, the controller adjusts the VCM drive signal to first quickly move the heads to the desired radial position and then to maintain the heads at that position. The controller accesses data organized in concentric annular tracks on the disks by positioning the heads at radial positions corresponding to the tracks. Data are stored in sectors on each track. With the heads hovering over the target track on the spinning disks, the controller may activate the heads to record data on the disks or read data from the disks.

The controller electronics typically include a microprocessor or microcontroller that operates in accordance with firmware instructions. The microprocessor controls the VCM in response to read and write commands it receives from the host computer. The microprocessor controls the VCM by providing digital acceleration values to a digital-to-analog converter (DAC), the output current of which is provided to the VCM driver. This DAC is known as the demand DAC.

The VCM operates in response to current through its coil. To efficiently seek the heads from an initial track to a target track, the microprocessor increases the current provided to the VCM to accelerate the actuator as it leaves the initial track and then reverses the current provided to the VCM to decelerate the actuator as it approaches the target track.

A disk drive typically includes a means for moving the actuator arm to a band or area at one edge of the disk outside of the area reserved for data storage. This procedure is known as parking. The area in which the heads are parked is most typically at the extreme inside edge of the disk and is known as the parking zone. Parking the heads minimizes the likelihood that the heads will inadvertently contact and thus damage the magnetic recording surface of the data storage portion of the disk.

A disk drive may park the heads in response to a park command received from the host computer. One of two different methods may be used to park the heads. A controlled seek to the landing zone under microprocessor control may be employed or a "hardware parking sequence" can be invoked. A useful hardware parking sequence puts the actuator driver into a controlled output-voltage mode to produce a low output voltage having a polarity and value sufficient to move the actuator toward the landing zone at low speed. This moves the heads slowly across the disk until they are stopped in the parking zone when the actuator arm hits a "crash stop" member. The crash stop absorbs the (slight) impact force to decrease the likelihood of damaging the heads or other portions of the actuator assembly.

A disk drive may also automatically park the heads in response to a power failure. A disk drive typically receives its power from the host computer direct current (DC) power supply via a cable. If a user turns the host computer off, or if the disk drive loses host computer power for any other reason, it is desirable to automatically, i.e., without user intervention, park the heads. A disk drive that parks its heads in response to a power failure typically includes a circuit for detecting failing host computer DC power, a circuit for rectifying the back electromotive force (BEMF) produced by the spinning disk, and a hardware parking circuit for implementing the hardware parking sequence mentioned above. Because host computer DC power is unavailable or of too low voltage to power the demand DAC, the rectifier circuit converts the BEMF to DC and supplies it to the actuator driver during parking. The kinetic energy stored in the still-spinning disk after power has been lost is sufficient to park the heads in this manner. A disk drive also typically includes a circuit for braking the disk by shorting the spindle motor windings after a delay period sufficient to ensure that the heads have reached the parking zone.

Parking the heads in response to detection of a power failure by using a constant voltage from the actuator driver is inefficient because maximum parking velocities and/or maximum seek velocities must be limited to handle a worst-case parking scenario. In the worst-case scenario, if a seek in the direction toward the parking zone is in progress when power fails, the actuator may not decelerate significantly when the reduced predetermined voltage is applied to the VCM because of the length of the VCM electrical time constant. The actuator arm may therefore hit the crash stop at a velocity higher than intended in the hardware parking sequence design. The maximum parking velocity and/or maximum seek velocity must be limited to a value below the maximum velocity of which the actuator is capable to eliminate a requirement for undesirably larger or more resilient crash stops to prevent damage to the heads and actuator from crash stop collisions at higher velocities. Larger or more complex crash stops are uneconomical and decrease the disk surface area usable for data storage.

It is desirable to provide a system for parking the heads in response to detection of a power failure that does not require limiting the maximum seek velocity and does not decrease the area of the disk surface usable for data storage. These problems and deficiencies are clearly felt in the art and are solved by this invention in the manner described below.

SUMMARY OF THE INVENTION

This invention includes a disk drive system for powering a disk drive microprocessor using BEMF generated by the still-spinning spindle motor after host DC power fails, and for parking the heads under microprocessor control in a manner similar to that of a conventional controlled seek. The system detects failing host computer DC power, converts the BEMF to DC, applies the DC power to the microprocessor, and moves the heads toward the parking zone in accordance with a "seek profile" (which specifies acceleration and deceleration characteristics during a controlled seek) or other suitable control method of a type normally used for seeking. Thus, the heads travel to the parking zone at controlled velocities that minimize the travel time. Note that this "travel time" is distinguished herein from "seek time" because a seek is conventionally understood as moving the heads to a track at which data are to be written or read rather than moving the heads to the parking zone.

In an illustrated embodiment, the system includes a voltage regulator for regulating the DC power applied to the microprocessor. The regulated power may be applied to other disk drive elements as well.

This invention facilitates faster yet gentler parking. Because parking is fast, this invention mimizes the likelihood of the head contacting the disk surface during parking. Moreover, because the invention eliminates the problem described above associated with a worst-case parking scenario, the disk drive may use higher maximum seek velocities to decrease seek times throughout normal operation of the drive. Furthermore, because parking is controlled and gentle, crash stop size may be minimized, thereby maximizing the area of the disk usable for data storage. The foregoing, together with other features and advantages of this invention, become more apparent when referring to the following specification, claims, and accompanying drawings.

BRIEF DESCRIPTION OF THE DRAWINGS

For a more complete understanding of this invention, reference is now made to the following detailed description of the embodiments illustrated in the accompanying drawings, wherein.

DESCRIPTION OF A PREFERRED EMBODIMENT

Figure 1:
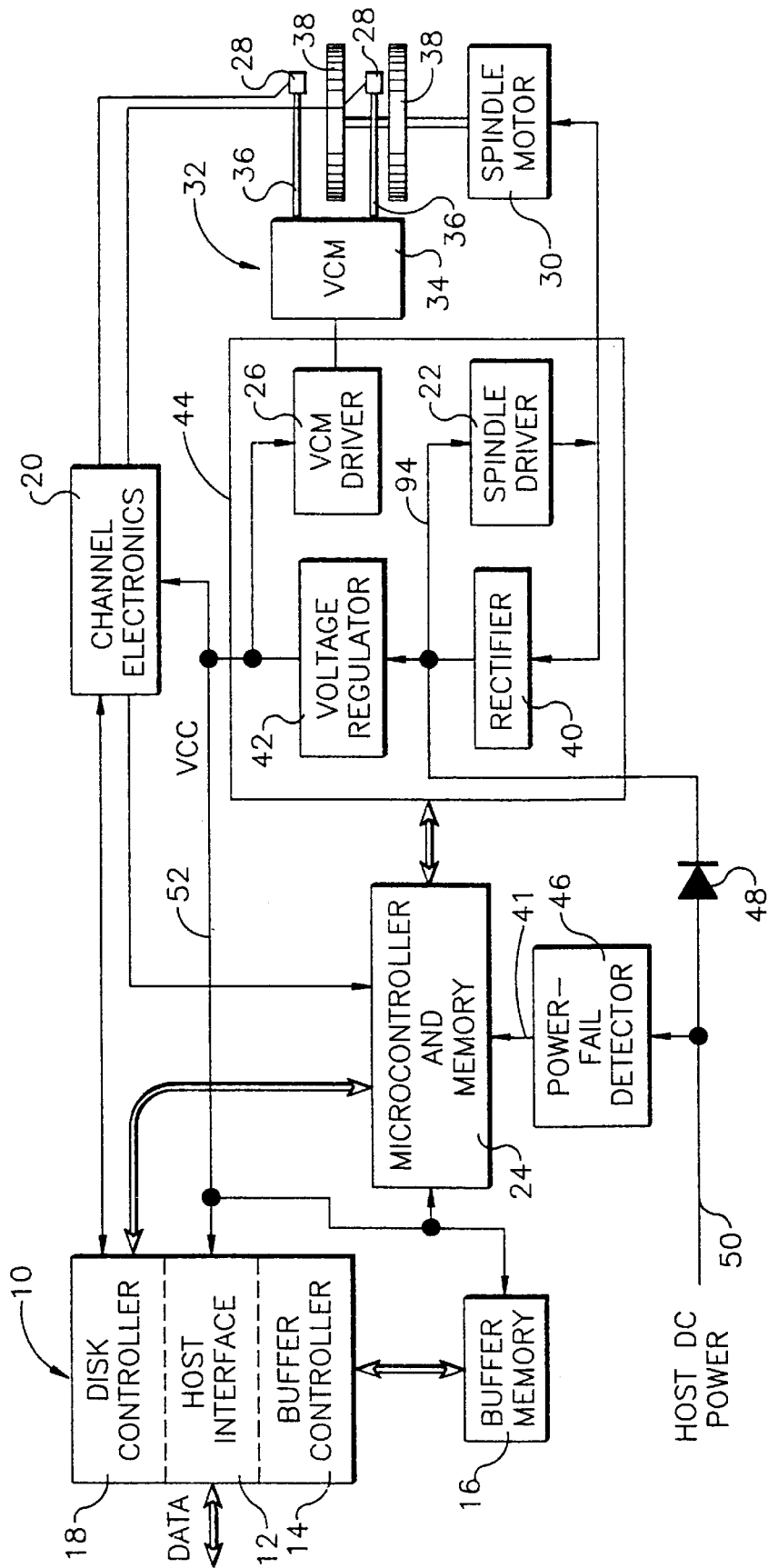
FIG. 1 is a block diagram of a disk drive having a microcontroller-controlled parking system.

As illustrated in FIG. 1, a disk drive includes a controller 10 having a host interface portion 12 for interfacing with a host computer (not shown), a buffer controller portion 14 for buffering in a buffer memory 16 the data received from the host computer and read from the disk, and a disk controller portion 18. The disk drive further includes channel electronics 20, a spindle motor driver 22, a microcontroller 24 having associated program memory, an actuator motor driver 26, read/write heads 28, a spindle motor 30, and an actuator 32. Actuator motor driver 26 includes an internal demand digital-to-analog converter (DAC) (not shown) that produces an acceleration current in response to a digital input value received from microcontroller 24. Actuator 32 includes an actuator motor 34 and actuator arms 36 on which heads 28 are mounted. Actuator motor 34 is preferably a voice coil motor (VCM). The disk drive also includes magnetically recordable disks 38. Spindle motor 30 rotates disks 38 and, in response to the acceleration current generated by actuator motor driver 26, actuator arms 36 move heads 28 across disks 38 to access the tracks on which data are recorded. Although two heads 28, two actuator arms 36 and two disks 38 are illustrated in FIG. 1, the disk drive may have any suitable number of heads, actuator arms and disks. The disk drive also includes a rectifier 40 and a voltage regulator 42. Rectifier 40, voltage regulator 42, actuator motor driver 26 and spindle motor driver 22 may be collocated in a combination driver integrated circuit chip 44. The disk drive also includes a power-fail detector 46 and a diode 48, the functions of which are explained below.

The disk drive receives power from the host computer. As known in the art, the host computer includes a power supply (not shown) that converts utility power, which is typically 120 volts (V) alternating current (AC) in the United States, to direct current (DC) at one or more predetermined voltages. These voltages typically include 5 V DC and 12 V DC. The host computer provides this power to its internal components (not shown), such as the central processing unit and memory. Via a suitable power cable (not shown), the host computer also supplies this power to disk drives that may be installed in the computer. The DC power thus supplied to the disk drive illustrated in FIG. 1 is referred to herein as the "host DC power signal" 50.

Voltage regulator 42, which may comprise any suitable voltage regulation circuit known in the art, receives host DC power signal 50 via diode 48 and produces a regulated power signal 52. Regulated power signal 52 is provided to microcontroller 24 and is also preferably distributed to the other above-described electronic components of the disk drive, including controller 10, buffer memory 16, channel electronics 20, and actuator motor driver 26. Regulated power signal 52 has a predetermined value that is required by the components that receive it. For example, a 5 V regulator 42 is used in a disk drive having a microprocessor requiring a supply voltage (VCC) of 5 V. Because commercial availability of components requiring a supply voltage of 3.3 V is increasing, voltage regulator 42 preferably provides regulated power signal 52 at 3.3 V. Nevertheless, two or more voltage regulators may be included to provide two or more different regulated voltages to different components of the disk drive. Furthermore, in other embodiments, host DC power signal 50 may be provided directly to certain components, bypassing voltage regulator 42. For example, a 5 V DC power signal 50 may be provided directly to components that require a 5 V DC supply voltage, but a 3.3 V regulated power signal 52 may be provided to other components, such as microcontroller 24.

Figure 2:
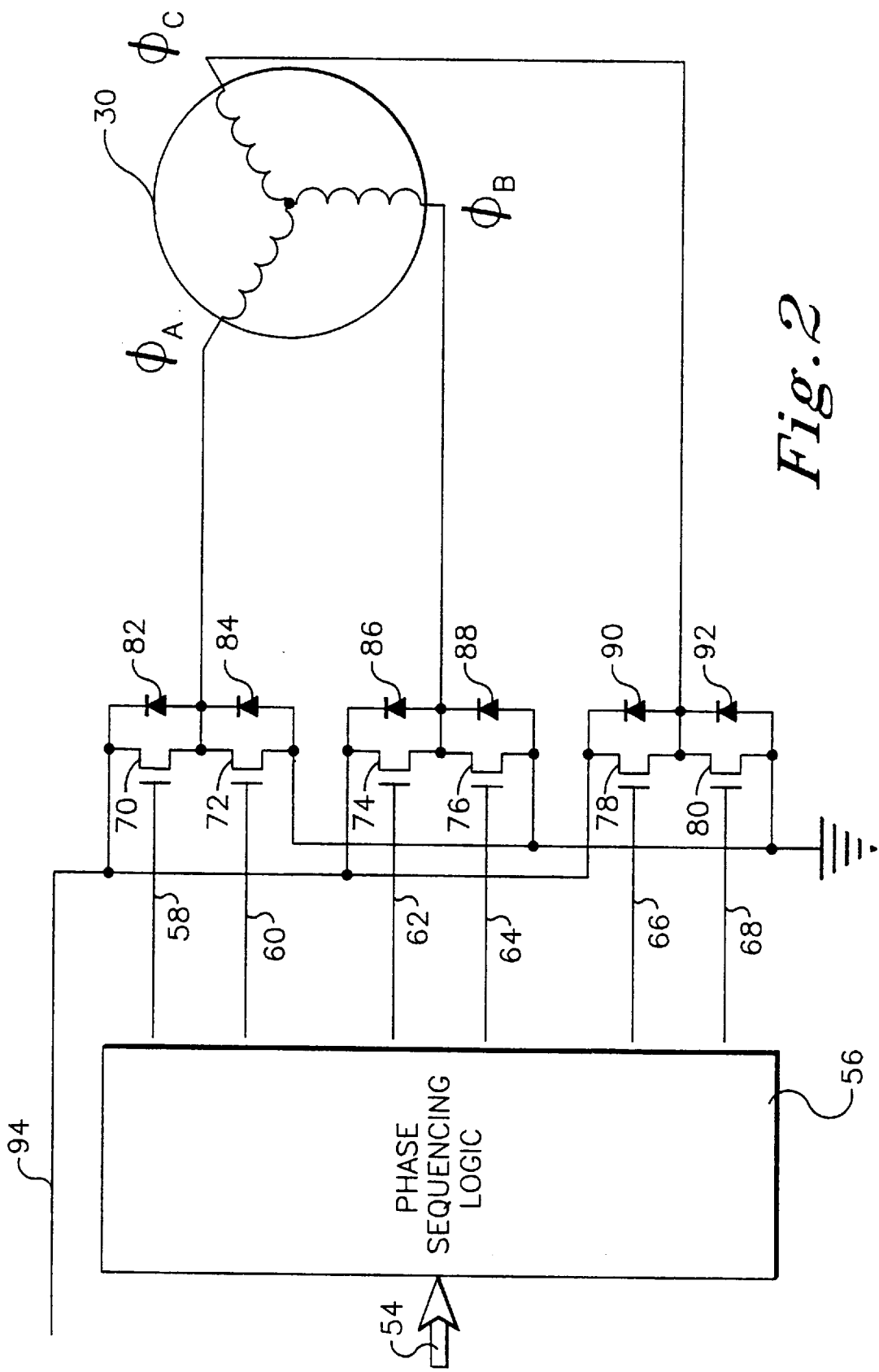
FIG. 2 is a circuit diagram of the spindle driver of the disk drive.

Spindle driver 22 and rectifier 40 may integrated to form the circuit illustrated in FIG. 2. This circuit is preferably included in the combination driver integrated circuit chip 44 (FIG. 1). In response to data signals 54 received from microcontroller 24, phase sequencing logic 56 generates phase control signals 58, 60, 62, 64, 66 and 68. Phase control signals 58 and 60 control the application of power to the phase A ($\phi_A$) winding of spindle motor 30 via metal-oxide semiconductor field-effect transistors (MOSFETs) 70 and 72, respectively; phase control signals 62 and 64 control the application of power to the phase B ($\phi_B$) winding of spindle motor 30 via MOSFETs 74 and 76, respectively; and phase control signals 66 and 68 control the application of power to the phase C ($\phi_C$) winding of spindle motor 30 via MOSFETs 78 and 80, respectively. Persons of skill in the art are readily capable of designing suitable phase sequencing logic 56. The circuit also includes commutation diodes 82, 84, 86, 88, 90 and 92, which may be parasitic in integrated circuit chip 44, discrete diodes formed in integrated circuit chip 44, or discrete diodes connected externally to integrated circuit chip 44 via pins (not shown). Commutation diodes 82–92 are arranged in a standard three-phase configuration. Each of diodes 82–92 prevents a voltage spike across a corresponding one of MOSFETs 70–80 when the MOSFET switches off the current in a winding of spindle motor 30 by providing a return current path.

During normal operation of the disk drive, the circuit illustrated in FIG. 2 receives a disk drive DC power signal 94 in response to host DC power signal 50 (FIG. 1). Microcontroller 54 controls phase sequencing logic 56 in a manner that sequentially distributes disk drive DC power signal 94 to the windings of spindle motor 30 to maintain it at a constant speed.

Figure 3:
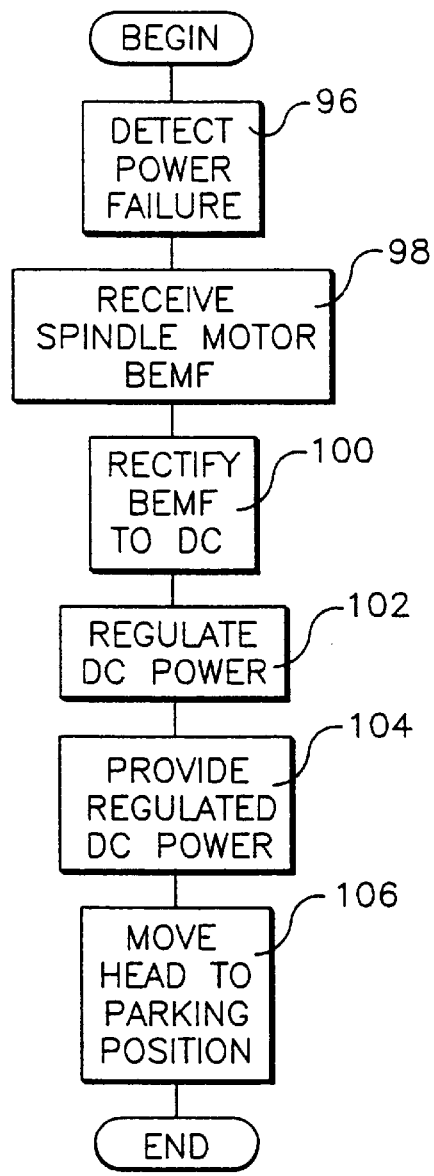
FIG. 3 is a flow diagram, illustrating the parking method.

If the voltage of host DC power signal 50 drops below a predetermined threshold level, the disk drive parks actuator 32 in accordance with the novel method of this invention illustrated in FIG. 3. During normal operation of the disk drive, power-fail detector 46 monitors host DC power signal 50 and compares it to the predetermined threshold voltage. When the voltage of host DC power signal 50 drops below this threshold, power-fail detector 46 initiates an interrupt in (or sets a power-failed signal line for polling by) microcontroller 24, as indicated by step 96 of the method. In response, at step 98 microcontroller 24 causes phase sequencing logic 56 to switch all MOSFETs 70–80 off (see FIG. 2). Switching all MOSFETs 70–80 off allows commutation diodes 82–92 to receive the back electromotive force (BEMF) produced by spindle motor 30 and convert the BEMF into DC, as indicated by step 100 of the method. This DC is provided to voltage regulator 42 as disk drive DC power signal 94. In other words, the DC power signal 94 generated by diodes 82–92 in response to the BEMF replaces the disk drive DC power signal 94 previously received via diode 48 in response to host DC power signal 50. Although commutation diodes 82–92 are preferred, in other embodiments other means for converting the BEMF produced by spindle motor 30 to DC, such as synchronous rectifiers, are also suitable. Diode 48 isolates the host computer power supply, thereby blocking the disk drive DC power signal 94 generated by diodes 82–92. Voltage regulator 42 regulates disk drive DC power signal 94, as indicated by step 102 of the method. Voltage regulator 42 provides regulated power signal 52 to microcontroller 24 and other disk drive electronic components, as indicated by step 104 of the method.

In response to the interrupt, microcontroller 24 moves actuator 32 to place heads 28 in the parking zone in a controlled manner, as indicated by step 106 of the method. Microcontroller 24 is programmed with suitable software stored in a suitable, preferably non-volatile, memory (not shown) associated with microcontroller 24. Therefore, the software may be referred to as firmware or micro code. The micro code relating to this invention may be integrated with micro code that controls other disk drive functions that are not the subject of this invention but that persons of skill in the art know to be conventionally included in disk drives, such as seeking and tracking. In accordance with this programming and in response to the interrupt, microcontroller 24 performs the method illustrated in FIG. 4.

Figure 4:
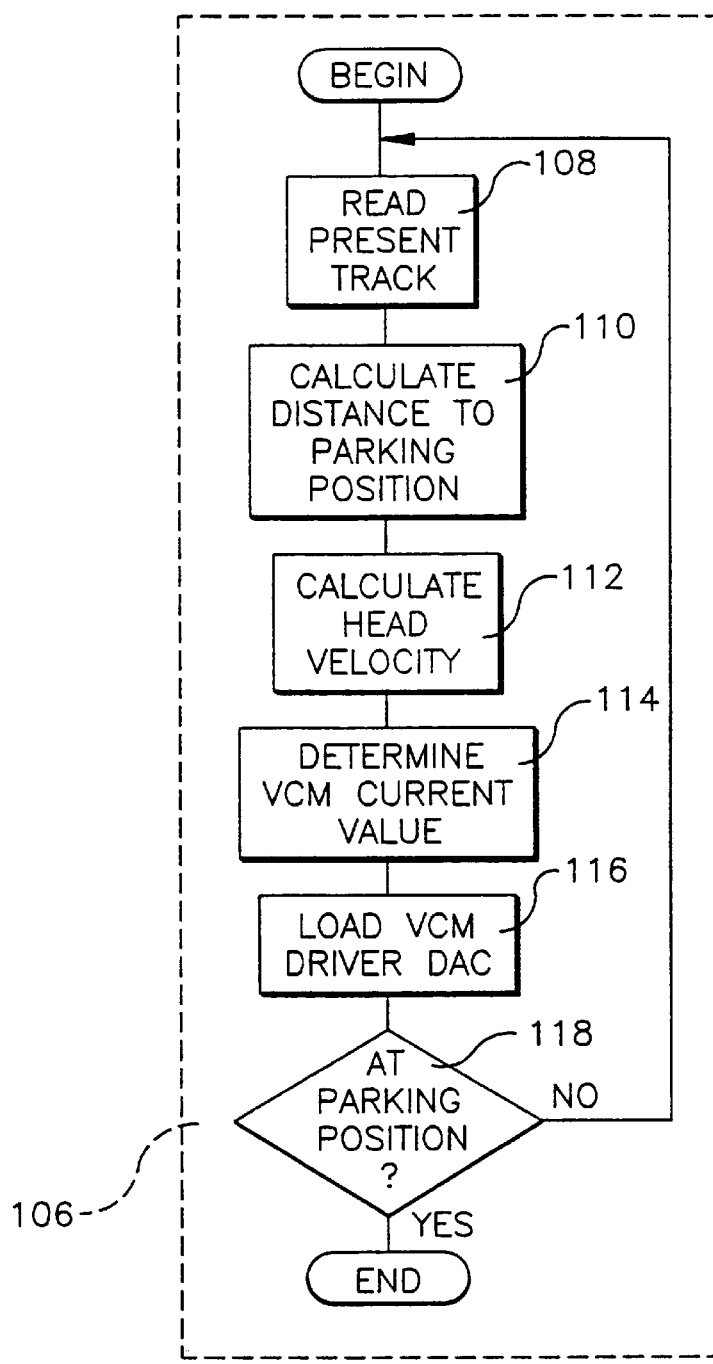
FIG. 4 is a flow diagram, illustrating the step of the parking method by which the heads are moved to the parking zone under microcontroller control.

The method illustrated in FIG. 4 is similar but not identical to a conventional seek. At step 108 microcontroller 24 reads servo signals to determine the track over which heads 28 are positioned. At step 110 microcontroller 24 calculates the distance or number of tracks between the position of heads 28 and the parking zone. At step 112 microcontroller 24 calculates the velocity of heads 28 in response to previously determined position information in the manner well-known in conventional seek algorithms. At step 114 microcontroller 24 uses a seek profile (not shown) to calculate an acceleration value in response to head velocity and distance to the parking zone in the manner well-known in conventional seek algorithms. At step 116 microcontroller loads this acceleration value into the demand DAC of actuator motor driver 26. At step 118 microcontroller 24 reads servo signals to determine the track over which heads 28 are positioned. If heads 28 are positioned over a track, i.e., an area of the disk usable for data storage, microcontroller 24 returns to step 108 to continue controlling actuator 32 in the above-described manner. If heads 28 are not positioned over a track, they are therefore at the parking position. Unlike a conventional seek in which microcontroller 24 reads the target track number upon arrival of the head, note that microcontroller 24 cannot read anything in the parking zone because no information is recorded there. If microcontroller 24 cannot read a track number at step 118, it is therefore in the parking zone, and microcontroller 24 transfers control to other software processes (not shown) or ceases operation. For example, although not part of the parking method illustrated in FIG. 4, microcontroller 24 may cause spindle motor driver 22 to short the windings of spindle motor 30, thereby generating a braking force. Disks 38 thus may slow to a stop relatively abruptly in response to this braking force or relatively slowly in response to inherent frictional forces. Nevertheless, in either case, the BEMF generated while disks 38 remain spinning after failure of host DC power is more than sufficient to provide power to microcontroller 24 and other disk drive components during the above-described parking process.

Heads 28 are thus parked rapidly and in a controlled manner, i.e., in accordance with a seek profile or similar means for controlling actuator velocity, so as to decelerate heads 28 as they approach the parking zone.

Another preferred method is the "blind-seek" parking method where the known position and velocity of actuator 32 at the time of power failure together with predetermined torque vs current characteristics of actuator 32 (such as are available from a power-up calibration procedure) are used by microprocessor 24 to create a series of demand values calculated to brings heads 28 to the parking zone without feedback. Because no feedback is used in a blind park, microprocessor 24 need never read a burst from the disk during the controlled movement to parking position. The blind park procedure may also be usefully modified by adding some iterative elements to feed back selective (infrequent) head position information from the disk.

Although in the above-described embodiment, microcontroller 24 preferably controls actuator 32 in response to a seek profile, persons of skill in the art can appreciate that microcontroller 24 may control actuator 32 using a method based on any other suitable seeking method known in the art. Because parking is as fast as controlled seeking, the likelihood of head-media contact during parking is much less than during a low-speed hardware parking sequence. Furthermore, maximum velocities during both parking and seeking need not be limited because this invention ensures that the actuator does not impact the crash stops at high velocities during parking, even under worst-case conditions. Moreover, crash stop size may be minimized, thereby maximizing the area of the disk available for data storage.

Clearly, other embodiments and modifications of this invention may occur readily to those of ordinary skill in the art in view of these teachings. Therefore, this invention is to be limited only by the following claims, which include all such other embodiments and modifications when viewed in conjunction with the above specification and accompanying drawings.

I claim:

1. A method for parking a head in a disk drive in response to a power failure in a host DC power signal, the disk drive including a head-positioning servo system that controllably moves the head across a disk surface from track to track during a seek operation, the servo system including a programmable, interruptable microprocessor that executes servo firmware to control head position based on feedback derived from data read from the disk surface, the method comprising the steps of:

detecting the power failure;

receiving back electromotive force (BEMF) from a spindle motor;

converting the BEMF to a disk drive direct current (DC) power signal;

regulating the disk drive DC power signal to produce a regulated power signal having a substantially constant predetermined voltage;

providing the regulated power signal to the microprocessor;

while providing the regulated power signal to the microprocessor:

producing an interrupt and providing the interrupt to the microprocessor to cause the microprocessor to branch to selected firmware;

executing the selected firmware to cause the head to move from the position it occupies at the time that the interrupt is produced to a parking position in accordance with a travel profile that controllably decelerates the head to a stop.

2. The method recited in claim 1, wherein the disk drive includes channel electronics that process signals utilized by the servo system, further comprising the step of providing the regulated power signal to the channel electronics.

3. A disk drive comprising:

a magnetic storage disk having a surface for storing data in tracks;

a spindle motor for rotating said disk;

a magnetic head;

a head-positioning servo system including:

an actuator motor for moving the head across the disk surface;

an actuator driver for providing a drive signal to the actuator motor;

a programmable, interruptable microprocessor that executes servo firmware to control head position based on feedback derived from data read from the disk surface;

a power-failure activated system comprising:

a power-fail detector for receiving a host DC power signal and for providing a power-fail signal in response to detection of a power failure;

a converter for receiving back electromotive force (BEMF) from the spindle motor and for converting the BEMF to a disk drive direct current (DC) power signal;

a voltage regulator for receiving the disk drive DC power signal and for providing a regulated power signal to the microprocessor;

means operative while the regulated power signal is provided to the microprocessor comprising:

means for producing an interrupt and providing the interrupt to the microprocessor to cause the microprocessor to branch to selected firmware;

means in the microprocessor for executing the selected firmware to cause the head to move from the position it occupies at the time that the interrupt is produced to a parking position in accordance with a travel profile that controllably decelerates the head to a stop.

* * * * *